United States Patent [19]

Frei et al.

[11] 4,149,851

[45] Apr. 17, 1979

[54] CONCENTRATED AQUEOUS DYE COMPOSITIONS CONTAINING A LOW MOLECULAR WEIGHT AMIDE

[75] Inventors: Alfred Frei, Binningen; Georg Schoefberger, Basel; August Schweizer, Muttenz, all of Switzerland

[73] Assignee: Fidelity Union Trust Company, Executive Trustee under Sandoz Trust, Newark, N.J.

[21] Appl. No.: 772,424

[22] Filed: Feb. 28, 1977

Related U.S. Application Data

[62] Division of Ser. No. 362,899, May 23, 1973, Pat. No. 4,023,924, which is a division of Ser. No. 739,213, Jun. 24, 1968, abandoned.

[30] Foreign Application Priority Data

Jul. 13, 1967 [CH] Switzerland ..................... 10042/67
Mar. 22, 1968 [CH] Switzerland ..................... 4325/68

[51] Int. Cl.$^2$ .................... D21D 3/00; D21H 1/46; D21H 3/80
[52] U.S. Cl. ............................................. 8/85 R; 8/7; 8/85 B; 8/86; 8/194; 162/162; 260/153; 260/158; 260/162; 260/167; 260/173; 260/175; 260/182; 260/183; 260/184; 260/187
[58] Field of Search .................. 260/167, 175, 173; 8/7, 85, 86, 194, 85 R, 85 B; 117/154; 162/162

[56] References Cited

U.S. PATENT DOCUMENTS

| | | | |
|---|---|---|---|
| 2,936,305 | 5/1960 | Porter et al. | 260/175 |
| 3,041,200 | 6/1962 | Steffen | 8/7 X |
| 3,128,222 | 4/1964 | Herschler et al. | 8/7 X |
| 3,487,067 | 12/1969 | Mudrak et al. | 260/173 |
| 3,600,376 | 8/1971 | Franklin | 260/175 |
| 3,621,008 | 11/1971 | Ross et al. | 260/175 |
| 3,643,269 | 2/1972 | Schweizer | 260/175 X |
| 3,681,320 | 8/1972 | Franklin | 260/175 |
| 3,701,624 | 10/1972 | Franklin | 8/7 |

FOREIGN PATENT DOCUMENTS 930303 7/1963 United Kingdom .......................... 8/17

OTHER PUBLICATIONS

Colour Index, vol. 3, 2nd Edition, p. #29220 (1957).
Kern, American Dyestuff Reporter, vol. of May 15, 1961, pp. 45 to 52.
Neilson, Du Pont Magazine, May–Jun., 1971, pp. 21 to 23.
Zimmerman et al., American Dyestuff Reporter, vol. of Jan. 26, 1948, pp. 47 to 51 and 58.

*Primary Examiner*—Floyd D. Higel
*Attorney, Agent, or Firm*—Gerald D. Sharkin; Richard E. Vila; Melvyn M. Kassenoff

[57] ABSTRACT

Concentrated, liquid preparations of metal-free direct azo dyes, which contain in each instance 1 part by weight of dye, 1 to 8 parts by weight of water, and 0.5 to 5 or preferably 0.5 to 2 parts by weight of an amide are useful for dyeing paper in the stock and for dyeing paper sheet.

20 Claims, No Drawings

CONCENTRATED AQUEOUS DYE COMPOSITIONS CONTAINING A LOW MOLECULAR WEIGHT AMIDE

This application is a division of application Ser. No. 362,899, filed May 23, 1973 and now U.S. Pat. No. 4,023,924, which is a division of application Ser. No. 739,213, filed June 24, 1968 and now abandoned.

This invention relates to concentrated, liquid preparations of metal-free direct dyes of the azo series, which contain in each instance 1 part by weight of dye, 1 to 8 parts by weight of water, and 0.5 to 5 or preferably 0.5 to 2 parts by weight of an acid amide. Mixtures of acid amides may be employed if desired. All water-soluble metal-free direct dyes, in particular those of the disazo and trisazo series, or mixtures of such dyes are suitable for the production of these preparations.

Highly suitable dyes for this purpose are substantive disazo dyes of the formula

  (I), where $F_1$ and $F_2$ represent radicals of identical or different monoazo dyes bearing water-solubilizing groups and A represents a bridge member, for example an imino group or the radical of a diamide of carbonic, fumaric or cyanuric acid.

Dyes of similarly good suitability are substantive disazo dyes of the formula

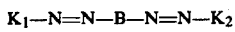 (II)

where B represents the radical of a tetrazo component of the diphenyl series and $K_1$ and $K_2$ represent identical or different coupling components bearing water-solubilizing groups. Suitable water-solubilizing groups are carboxylic and sulphonic acid amide groups and preferably the sulphonic acid group.

The substantive azo dyes contain preferably 1 to 4 water-solubilizing groups per azo group.

The amides of inorganic and organic acids may be employed as acid amides, but carboxylic acid amides are preferred, e.g. those of monobasic or dibasic carboxylic acids such as the amides of carboxylic acids of low molecular weight containing, e.g. 2 to 4 carbon atoms, e.g. acetamide, propionic acid amide, butyric acid amide and malonic acid diamide. Urea and urea derivatives are particularly well suited; examples, besides urea itself, are substituted or unsubstituted alkylurea compounds such as methyl and ethyl urea, N,N'-dimethyl urea, dihydroxyalkyl urea, etc. Further, guanidine and its derivatives such as methyl guanidine are well suited, and so are the formamides, e.g. formamide itself and alkylformamide, such as methylformamide and dimethyl formamide. Sulphonic acid amides, e.g. sulphonic acid diamides, are also suitable for the production of the dye preparations of this invention.

The dye preparations are produced by mixing the aforenamed components and heating the mixture for a short time if necessary. The preparations may contain further assistants if desired, for instance dyeing assistants if used for textile dyeing or paper auxiliary products if used for paper dyeing, such as pH-stabilizing agents, e.g. amino acids, phosphates and acetates. The urea component itself can be employed as a pH-stabilizing agent. Other additions which the preparations may contain are softeners, water repellant agents, dispersing agents and agents for improving the wet tensile strength.

In French Pat. No. 1,420,403 dyeing preparations are described which contain 1 part by weight of dye, 0.01 to 75 parts by weight of water and 2 to 100 parts by weight of an acid amide. These preparations are employed solely for the dyeing of leather and accordingly they contain only leather dyes, in particular metal complex dyes. In all the examples of the named French patent metal complex dyes are employed. No mention is made of metal-free direct dyes.

The advantage of the new preparations is that they contain substantially smaller amounts of acid amide. Hence, they are more economical and the waste water from dyeing is less heavily contaminated.

The new preparations can be employed for the dyeing of paper, either as true aqueous solutions or as dispersions diluted with water as necessary. They are equally suitable for dyeing paper in the stock and by dipping and coating techniques.

Another advantage of the dyeing preparations here disclosed is that they are easier to handle. There is no inconvenient dusting in weighing out as with powder dyes and the liquid form makes them well suited for application in continuous dyeing processes.

The preparations are storable for several months at room temperature. They are not affected by frost and are immune to mould growth.

In the following Examples the parts and percentages are by weight and the temperatures in degrees centigrade.

EXAMPLE 1

62.4 Parts of the sodium salt of the disazo dye of the formula

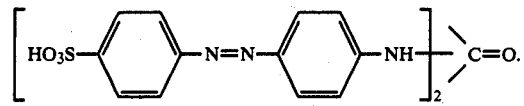

in the form of a 50% aqueous paste are stirred in 275 parts of water to form a homogeneous mixture and dissolved by the addition of 100 parts of urea. The dye solution is then made up to 500 parts. It is storable for several months at room temperature. When employed for dyeing paper in the stock, this liquid preparation gives bright yellow dyeings.

EXAMPLE 2

68.4 Parts of the sodium salt of the disazo dye of the formula

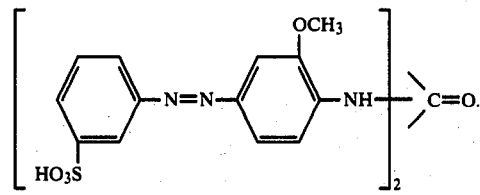

as a 55% aqueous paste are added to 275 parts of water at 40° and stirred to form a homogeneous mixture, whereupon the dye is brought into solution by adding 100 parts of urea. The solution is filtered to eliminate small amounts of insoluble impurities, after which 500 parts of a preparation are obtained which is storable for several months at room temperature. With this liquid preparation bright yellow paper dyeings are obtained.

EXAMPLE 3

A 40% aqueous paste of 95.6 parts of the sodium salt of the disazo dye C.I. Direct Yellow 50 (Colour Index, 2nd, ed., No. 29025) having the formula

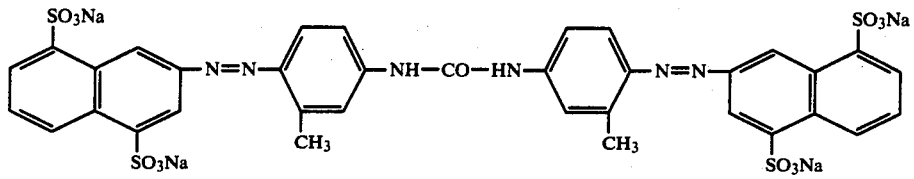

are homogeneously mixed with 160 parts of water, with the subsequent addition of 200 parts of urea. On heating to 70°–80° the dye goes into solution. The solution is filtered with the addition of 5 parts of "Hyflo" (registered trade mark) filter earth and cooled. 600 Parts of a liquid preparation are obtained which is storable for several months at room temperature. It gives bright reddish yellow dyeings on paper.

EXAMPLE 4

101.6 Parts of the sodium salt of the disazo dye C.I. Direct Yellow 34 (Colour Index, 2nd ed., No. 29060) having the formula

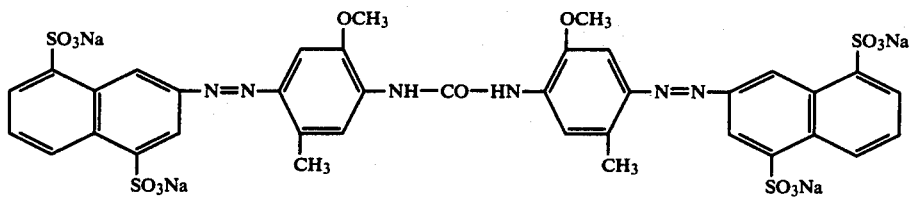

in the form of a 37% aqueous paste are homogeneously mixed with 415 parts of water, after which 175 parts of urea are added and the temperature increased to 85°–90°, at which temperature the dye goes into solution. 6 Parts of "Hyflo" filter earth are added and the solution is filtered to give 865 parts of a liquid dye preparation. The preparation is storable for several months at room temperature and gives bright golden yellow dyeings on paper.

EXAMPLE 5

126.4 Parts of the sodium salt of the disazo dye of the formula

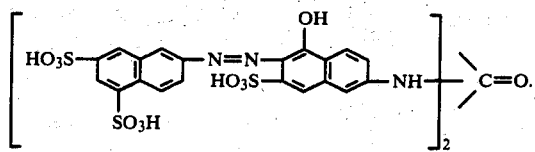

as a 40% aqueous paste are added with stirring to a solution of 250 parts of urea and 310 parts of water and dissolved by raising the temperature to 60°–70°. 5 Parts of "Hyflo" filter earth are added and the solution filtered to yield 875 parts of a liquid dye preparation which is storable for several months at room temperature. With this preparation bright scarlet paper dyeings can be produced.

EXAMPLE 6

99.2 Parts of the sodium salt of the disazo dye C.I. Direct Blue 15 (Colour Index, 2nd ed., No. 24400) having the formula

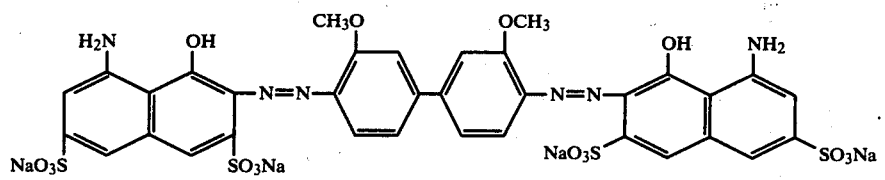

in the form of a 50% aqueous paste are dissolved in a solution of 152 parts of urea and 410 parts of water at room temperature. After the addition of 4 parts of "Hyflo" filter earth the solution is filtered. 760 Parts of a dye preparation are obtained which is storable at room temperature for several months. It gives bright blue dyeings on paper.

EXAMPLE 7

99.2 Parts of the sodium salt of the disazo dye C.I. Direct Blue 1 (Colour Index, 2nd ed., No. 24410) having the formula

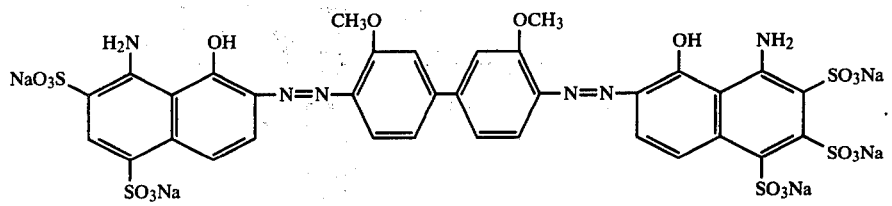

as a 50% aqueous paste are homogeneously mixed with 402 parts of water and dissolved at room temperature by the addition of 200 parts of urea. The solution is clarified by filtration using 5 parts of "Hyflo" filter earth. The product is 800 parts of a dye preparation which is storable for several months at room temperature and gives bright blue paper dyeings.

Dyeing Example A 0.3 Parts of the dyeing preparation as described in Example 2 are added to a stock of 100 parts of chemically bleached sulphite cellulose in 2000 parts of water while it is being beaten in the beater. After 15 minutes the stock is sized which fixes the dyeing. Paper fabricated from this stock is dyed in a yellow shade of medium depth and the fastness properties of the dyeing are good. The back-water is colourless.

Paper dyeings of similar shade can be obtained when the dyes of Examples 2, 4, and 24a are applied as they are without further preparation by the methods described in Dyeing Examples A or B.

Dyeing Example B

A charge of 70 parts of chemically bleached sulphite cellulose from coniferous wood pulp and 30 parts of chemically bleached sulphate cellulose from birchwood pulp in 2000 parts of water is mechanically treated in the pulper and at a suitable point 0.2 parts of the liquid dye preparation of Example 4 are added to it. After a further 20 minutes' processing the stock is converted into absorbent paper dyed in a golden yellow shade of medium depth.

Further liquid dye preparations of similarly good quality can be prepared in accordance with the procedures of Examples 1 to 7 with the dyes of the following Table 1, which are of the general formula

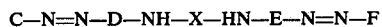

The meanings of C, D, E, F and X are noted in the appropriate columns of the table.

TABLE 1

| Example No. | C = Radical of | D = Radical of | E = Radical of | F = Radical of | X = Radical of | Shade on paper |
|---|---|---|---|---|---|---|
| 8 | 1-Aminobenzene-3-sulphonic acid | 1-Amino-2-methoxybenzene | 1-Amino-3-methylbenzene | 2-Aminonaphthalene-4,8-disulphonic acid | Phosgene | yellow |
| 9 | 2-Aminonaphthalene-5,7-disulphonic acid | 1-Amino-3-meth.ylbenzene | as D | as C | " | " |
| 10 | 2-Aminonaphthalene-6,8-disulphonic acid | " | as D | as C | " | " |
| 11 | " | " | 1-Amino-3-methylbenzene | as C | Fumaric acid | " |
| 12 | 1-Amino-2-methylbenzene-4,6-disulphonic acid | 2-Amino-5-hydroxynaphthalene-7-sulphonic acid | as D | as C | Phosgene | orange |
| 13 | 1-Amino-2-methylbenzene-4-sulphonic acid | " | as D | as C | " | yellowish scarlet |
| 14 | 1-Amino-4-methylbenzene-3-sulphonic acid | " | as D | as C | " | " |
| 15 | 1-Amino-4-methoxybenzene-3-sulphonic acid | " | as D | as C | " | scarlet |
| 16 | 1-Amino-4-methoxybenzene-2-sulphonic acid | 2-Amino-5-hydroxynaphthalene-7-sulphonic acid | as D | as C | " | " |
| 17 | 1-Amino-2-methoxybenzene-4-sulphonic acid | " | as D | as C | " | " |
| 18 | 2-Aminonaphthalene-4,8-disulphonic acid | " | as D | as C | " | " |
| 19 | 2-Aminonaphthalene-6,8-disulphonic acid | " | as D | as C | " | " |
| 20 | 2-Aminonaphthalene-4,8-disulphonic acid | " | as D | 2-Aminonaphthalene-6-sulphonic acid | " | " |
| 21 | 3-Acetylamino-1-aminobenzene- | " | as D | as C | " | " |

TABLE 1-continued

| Example No. | C = Radical of | D = Radical of | E = Radical of | F = Radical of | X = Radical of | Shade on paper |
|---|---|---|---|---|---|---|
| 22 | 2-Aminonaphthalene-4,8-disulphonic acid 6-sulphonic acid | " | as D | as C | 2-Amino-4,6-dichloro-1,3,5-triazine | " |
| 23 | " | " | as D | as C | 2-Phenylamino-4,6-dichloro-1,3,5-triazine | " |
| 24 | 2-Aminonaphthalene-5,7-disulphonic acid | " | as D | as C | 2-Phenylamino-4,6-dichloro-1,3,5-triazine-3'-sulphonic acid | " |
| 24a | 2-Aminonaphthalene-6-sulphonic acid | " | as D | as C | Phosgene | " |
| 25 | 1-Aminonaphthalene-4,6-disulphonic acid | " | as D | as C | " | red |
| 26 | 1-Aminonaphthalene-5-sulphonic acid | " | as D | as C | " | " |

Similarly good dye preparations can be prepared in accordance with Examples 1 to 7 using the dyes set out in the following Table 2, which are of formula (II) and in which the symbols $K_1$, $K_2$ and B have the meanings assigned to them in the appropriate columns.

TABLE 2

| Example No. | $K_1$ = Radical of | $K_2$ = Radical of | B = Radical of | Shade on paper |
|---|---|---|---|---|
| 27 | 1-Amino-8-hydroxynaphthalene-3,6-disulphonic acid | 1-Amino-8-hydroxynaphthalene-3,6-disulphonic acid | 4,4'-Diamino-1.1'-diphenyl | reddish blue |
| 28 | " | " | 4,4'-Diamino-3,3'-dimethyl-1,1'-diphenyl | blue |
| 29 | 1,8-Dihydroxynaphthalene-3,6-disulphonic acid | " | 4,4'-Diamino-3,3'-dimethoxy-1,1'-diphenyl | " |
| 30 | " | 1,8-Dihydroxynaphthaline-3,6-disulphonic acid | " | " |
| 31 | " | " | 4,4'-Diamino-3,3'-dimethyl-1.1'-diphenyl | " |
| 32 | 1-Amino-8-hydroxynaphthalene-2,4-disulphonic acid | as $K_1$ | 4,4'-Diamino-3,3'-dimethoxy-1,1'-diphenyl | " |

Similarly good liquid dye preparations can be prepared in accordance with Examples 1 to 7 with the dyes enumerated in the following Table 3.

TABLE 3

| Example No. | Dye Constitution | Shade on paper |
|---|---|---|
| 33 | [structure with DK group: H3C-, SO3H, N=C-S-, linked to SO3H-phenyl-N=N-CH(CO-CH3)-CO-HN-phenyl(OCH3)(SO3H)] | greenish yellow |
| 34 | DK-CH(CO-)—C(CH3)=N—N(phenyl-SO3H) | reddish yellow |
| 35 | DK-naphthalene(HO)(HO3S)-NH2 | scarlet |

TABLE 3-continued

| Example No. | Dye Constitution | Shade on paper |
|---|---|---|
| 36 | [structure: naphthalene with HO, DK, HO₃S, NHCOCH₃ substituents] | red |
| 37 | [structure: methylphenyl-N=C-SCH₃ linked azo naphthalene with OH, SO₃H] | red |
| 39 | [structure: HO₃S-phenyl-N=N-phenyl-N=N-naphthalene with HO, HO₃S, NHCO-phenyl] | red |
| 40 | [structure: HO₃S-phenyl-N=N-phenyl(SO₃H)-N=N-naphthalene with HO, HO₃S, NHCO-phenyl] | red |
| 41 | [structure: bis(HO₃S-phenyl-N=N-phenyl(SO₃H)-N=N-naphthalene with HO, HO₃S, NH—)₂C=O] | bluish red |
| 42 | [structure: phenyl(SO₃H)-N=N-naphthalene(HO,HO₃S)-NH-naphthalene(OH,SO₃H)-N=N-phenyl(SO₃H)] | blue red |
| 43 | [structure: H₂N-phenyl(NH₂)-N=N-biphenyl-N=N-naphthalene(H₂N,OH,HO₃S,SO₃H)-N=N-phenyl(SO₃H)] | black |
| 44 | [structure: CH₃,H₂N-phenyl(NH₂)-N=N-biphenyl-N=N-naphthalene(H₂N,OH,HO₃S,SO₃H)-N=N-phenyl(SO₃H)] | black |

The composition of further liquid dye preparations conforming to the invention is set forth in Table 4 below. The tabulation gives the number of parts by weight of dye in the preparation and the number of the Example in Table 1, 2 or 3 which identifies the dye, the number of parts of acid amide or acid amide mixture, and the number of parts of water.

TABLE 4

| Example No. | Parts | Dye of Example | Parts | Acid amide | Parts Water |
|---|---|---|---|---|---|
| 45 | 1.0 | No. 2 | 0.5 | Urea | 8.0 |
| 46 | 1.0 | No. 4 | 0.5 | " | 8.0 |
| 47 | 1.0 | No. 6 | 0.5 | " | 8.0 |
| 48 | 1.0 | No. 1 | 5.0 | " | 6.0 |
| 49 | 1.0 | No. 2 | 5.0 | " | 6.0 |
| 50 | 1.0 | No. 9 | 5.0 | " | 6.0 |
| 51 | 1.0 | No. 2 | 2.5 | " | 3.5 |
| 52 | 1.0 | No. 4 | 1.0 | " | 6.0 |
| 53 | 1.0 | No. 11 | 3.0 | " | 6.0 |

TABLE 4-continued

| Example No. | Parts | Dye of Example | Parts | Acid amide | Parts Water |
|---|---|---|---|---|---|
| 54 | 1.0 | No. 24a | 2.0 | " | 7.0 |
| 55 | 1.0 | No. 42 | 2.0 | " | 4.0 |
| 56 | 1.0 | No. 43 | 4.0 | " | 6.0 |
| 57 | 1.0 | No. 16 | 5.0 | " | 8.0 |
| 58 | 1.0 | No. 24 | 5.0 | " | 8.0 |
| 59 | 1.0 | No. 8 | 5.0 | " | 8.0 |
| 60 | 1.0 | No. 28 | 5.0 | " | 8.0 |
| 61 | 1.0 | No. 37 | 5.0 | " | 8.0 |
| 61a | 1.0 | No. 2 | 2.0 | " | 6.0 |

TABLE 4-continued

| Example No. | Parts | Dye of Example | Parts | Acid amide | Parts Water |
|---|---|---|---|---|---|
| 61b | 1.0 | No. 4 | 2.0 | " | 6.0 |
| 62 | 1.0 | No. 2 | 0.5 | Formamide | 8.0 |
| 63 | 1.0 | No. 4 | 0.5 | " | 8.0 |
| 64 | 1.0 | No. 5 | 0.5 | " | 8.0 |
| 65 | 1.0 | No. 6 | 0.5 | " | 8.0 |
| 66 | 1.0 | No. 13 | 0.5 | " | 8.0 |
| 67 | 1.0 | No. 24a | 0.5 | " | 8.0 |
| 68 | 1.0 | No. 2 | 5.0 | " | 1.0 |
| 69 | 1.0 | No. 4 | 5.0 | " | 1.0 |
| 70 | 1.0 | No. 7 | 5.0 | " | 1.0 |
| 71 | 1.0 | No. 27 | 5.0 | " | 1.0 |
| 72 | 1.0 | No. 1 | 5.0 | " | 8.0 |
| 73 | 1.0 | No. 3 | 5.0 | " | 8.0 |
| 74 | 1.0 | No. 5 | 5.0 | " | 8.0 |
| 75 | 1.0 | No. 7 | 5.0 | " | 8.0 |
| 76 | 1.0 | No. 2 | 1.0 | " | 4.0 |
| 77 | 1.0 | No. 4 | 2.0 | " | 4.0 |
| 78 | 1.0 | No. 7 | 2.0 | " | 4.0 |
| 79 | 1.0 | No. 24a | 3.0 | " | 5.0 |
| 80 | 1.0 | No. 26 | 4.0 | " | 5.0 |
| 80a | 1.0 | No. 24a | 2.0 | " | 8.0 |
| 81 | 1.0 | No. 2 | 0.5 | Acetamide | 8.0 |
| 82 | 1.0 | No. 6 | 0.5 | " | 8.0 |
| 83 | 1.0 | No. 27 | 0.5 | " | 8.0 |
| 84 | 1.0 | No. 2 | 5.0 | " | 4.0 |
| 85 | 1.0 | No. 7 | 5.0 | " | 4.0 |
| 86 | 1.0 | No. 4 | 5.0 | " | 8.0 |
| 87 | 1.0 | No. 30 | 5.0 | " | 8.0 |
| 88 | 1.0 | No. 32 | 3.0 | " | 6.0 |
| 89 | 1.0 | No. 2 | 1.2 / 0.8 | Urea / Formamide | 4.0 |
| 90 | 1.0 | No. 4 | 1.5 / 0.5 | Urea / Ethyl urea | 7.0 |
| 91 | 1.0 | No. 13 | 3.0 / 1.0 | Formamide / Methylformamide | 3.0 |
| 92 | 1.0 | No. 24a | 2.0 / 1.0 | Urea / Formamide | 8.0 |
| 93 | 1.0 | No. 27 | 1.0 / 1.0 | Formamide / Methylformamide | 6.0 |
| 94 | 1.0 | No. 24a | 1.5 / 0.3 | Urea / Formamide | 8.0 |

The dyes of formula (I) can be produced by the method described in German Pat. Nos. 122,904; 132,511 and 216,666. Dyes of formula (I) in which A stands for example for the radical of a cyanuric acid can be produced in accordance with German Pat. No. 436,179.

Dyes of formula (II) can be obtained by the process of German Patent 74,593.

The dye of Example 33 is produced in accordance with German Pat. No. 293,333, that of Example 37 with German Pat. No. 48,465, that of Example 42 with German Pat. No. 114,841, and the dyes of Examples 43 and 44 in accordance with German Pat. No. 153,559.

The dyes of Examples 33 to 37 are known from German Pat. No. 48,465, but they can also be produced by the process of German Pat. No. 293,333.

The dye of Example 24a can be produced by any of the known methods as follows:
a. coupling 2 moles of diazotized 2-naphthylamine-6-sulphonic acid with 1 mole of 5,5'-dihydroxy-7,7'-disulpho-2,2'-dinaphthyl urea;
b. coupling diazotized 2-naphthylamine-6-sulphonic acid with 2-amino-5-hydroxynaphthalene-7-sulphonic acid and reacting 2 moles of the resulting compound with phosgene;
c. coupling diazotized 2-naphthylamine-6-sulphonic acid with 2-acylamino-5-hydroxynaphthalene-7-sulphonic acid, saponifying the acylamino group and reacting the resulting compound with phosgene.

Similarly good dye preparations are obtained by using lactams or lactam mixtures. For example, the urea used in Examples 1 to 7 can be replaced by lactams or mixtures of lactams; such a preparation can be produced as follows:

EXAMPLE 95

106 Parts of the sodium salt of the disazo dye of Example 24a in the form of a 38% aqueous paste are homogeneously stirred in 665 parts of water, and after the addition of 350 parts of γ-butyrolactam the mixture is raised to 85°–90°, whereupon the dye goes into solution. 5 Parts of "Hyflo" filter earth are added and the solution filtered clear, giving 1294 parts of a liquid dye preparation which is storable for several months at room temperature. Bright red paper dyeings can be produced with this preparation.

Dye preparations of similarly good quality are obtained when the butyrolactam is replaced by ε-caprolactam.

EXAMPLE 96

100 Parts of chemically bleached sulphite cellulose in 2000 parts of water are beaten in a beater. 0.03 Parts of the dye of the formula

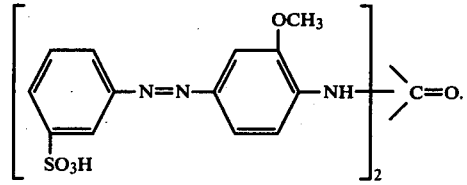

are added and after 15 minutes the stock is sized, which fixes the dyeing. Paper made from this stock is dyed in a yellow shade of medium depth. Paper dyeings of similar shade can be obtained by the procedure of this Example using the dye of formula (b) or (c) in place of the one of Example 96.

Dye (b)

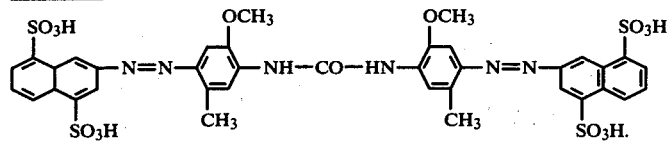

(b).

Dye (c)

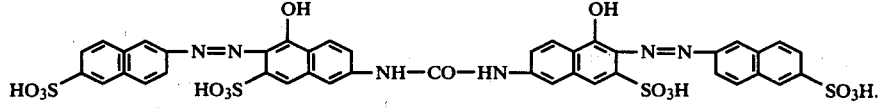

(c).

Having thus disclosed the invention what we claim is:

1. A concentrated, liquid dye composition comprising (i) 1 part by weight of a dye or a mixture thereof, (ii) 0.5 to 5 parts by weight of an amide or a mixture thereof and (iii) 1 to 8 parts by weight of water, wherein said dye is a water-soluble, metal-free, substantive, direct disazo dye of the formula

or

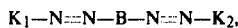

wherein each of

F$_1$ and F$_2$ is independently the radical of a monoazo dye having at least one water-solubilizing sulfo, carboxy or sulfamoyl group, A is —NH—, —NH—CO—NH—, trans—N-H—CO—CH=CH—CO—NH— or

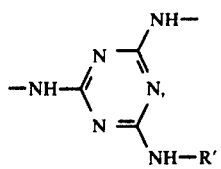

wherein

R' is hydrogen, phenyl or 3-sulfophenyl, each of

K$_1$ and K$_2$ is independently a coupling component radical having at least one water-solubilizing sulfo, carboxy or sulfamoyl group, and B is diphenylene or the radical of a tetrazotizable substituted diphenyldiamine, and said amide is guanidine, methylguanidine, γ-butyrolactam, ε-caprolactam, malonic acid diamide or a compound of the formula

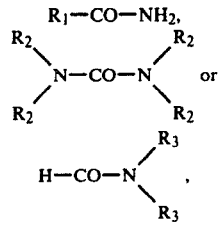

wherein

R$_1$ is C$_{1-3}$alkyl, each

R$_2$ is independently hydrogen, lower alkyl or lower hydroxyalkyl, and each

R$_3$ is independently hydrogen or lower alkyl.

2. A concentrated, liquid dye composition according to claim 1 wherein said dye is a water-soluble, metal-free, substantive, direct disazo dye of the formula

wherein each of

F$_1$ and F$_2$ is independently the radical of a monoazo dye having at least one water-solubilizing sulfo, carboxy or sulfamoyl group, and A is —NH—, —NH—CO—NH—, trans—N-H—CO—CH=CH—CO—NH— or

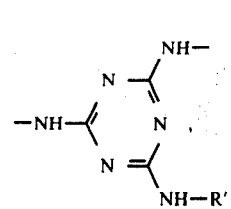

wherein

R' is hydrogen, phenyl or 3-sulfophenyl.

3. A concentrated, liquid dye composition according to claim 1 wherein said dye is a water-soluble, metal-free, substantive, direct disazo dye of the formula

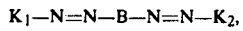

wherein each of

K$_1$ and K$_2$ is independently a coupling component radical having at least one water-solubilizing sulfo, carboxy or sulfamoyl group, and B is a diphenylene or the radical of a tetrazotizable substituted diphenyldiamine.

4. A concentrated, liquid dye composition according to claim 1 wherein said amide is urea.

5. A concentrated, liquid dye composition according to claim 4 consisting essentially of (i) 1 part by weight of a dye or a mixture thereof, (ii) 0.5 to 5 parts by weight of urea and (iii) 1 to 8 parts by weight of water.

6. A concentrated, liquid dye composition according to claim 1 comprising (i) 1 part by weight of a dye or a mixture thereof, (ii) 0.5 to 5 parts by weight of an amide or a mixture thereof and (iii) 1 to 8 parts by weight of water, wherein said dye is a dye of the formula

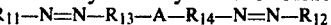

or

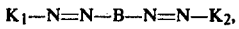

or a salt thereof, wherein each of

R$_{11}$ and R$_{12}$ is independently

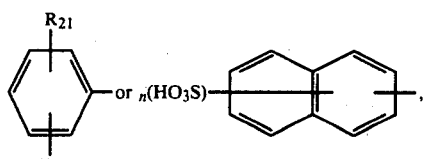

wherein

R$_{21}$ is hydrogen, methyl or methoxy, and n is 1 or 2,

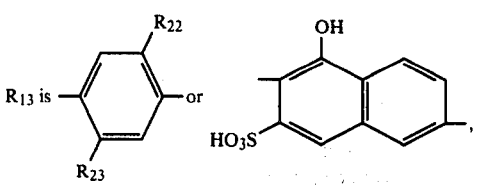

wherein

R$_{22}$ is hydrogen or methoxy, and

R$_{23}$ is hydrogen or methyl,

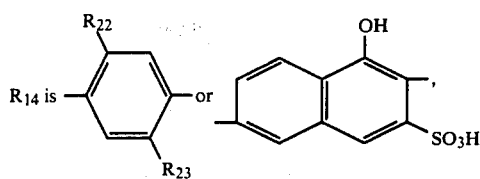

wherein
$R_{22}$ is hydrogen or methoxy,
and
$R_{23}$ is hydrogen or methyl,
A is —NH—, —NH—CO—NH, trans—NH—CO—CH=CH—CO—NH—

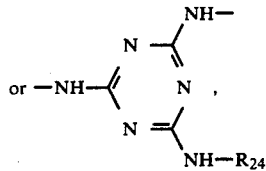

wherein
$R_{24}$ is hydrogen, phenyl or 3-sulfophenyl,
each of
$K_1$ and $K_2$ is independently

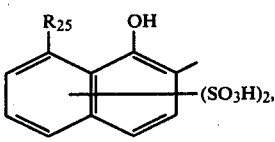

wherein
$R_{25}$ is —NH$_2$ or —OH, and

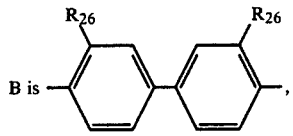

wherein each
$R_{26}$ is hydrogen, methyl or methoxy, and
said amide is guanidine, methylguanidine, γ-butyrolactam, ε-caprolactam, malonic acid diamide or a compound of the formula

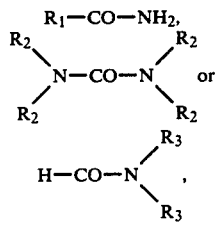

wherein
$R_1$ is $C_{1-3}$alkyl,
each
$R_2$ is independently
hydrogen, lower alkyl or lower hydroxyalkyl, and
each
$R_3$ is independently
hydrogen or lower alkyl.

7. A concentrated, liquid dye composition according to claim 6 comprising (i) 1 part by weight of a dye or a mixture thereof, (ii) 0.5 to 5 parts by weight of urea and (iii) 1 to 8 parts by weight of water, wherein said dye is a dye of the formula $$R_{11}-N=N-R_{13}-A-R_{14}-N=N-R_{12}$$

or $$K_1-N=N-B-N=N-K_2$$

or a salt thereof,
wherein each of
$R_{11}$ and $R_{12}$ is independently

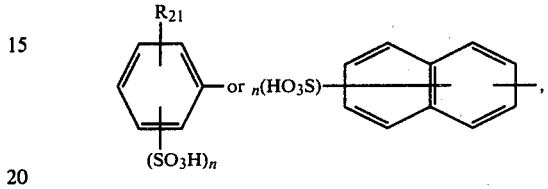

wherein
$R_{21}$ is hydrogen, methyl or methoxy,
and
n is 1 or 2,

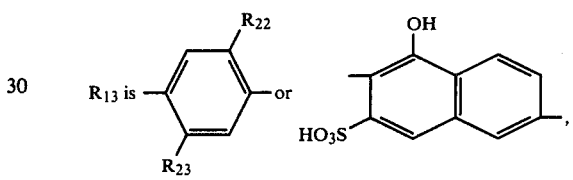

wherein
$R_{22}$ is hydrogen or methoxy,
and
$R_{23}$ is hydrogen or methyl,

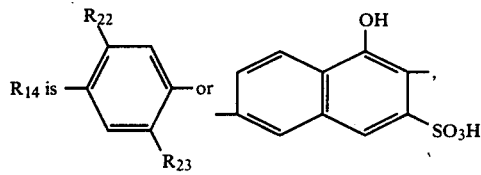

wherein
$R_{22}$ is hydrogen or methoxy,
and
$R_{23}$ is hydrogen or methyl,
A is —NH—, —NH—CO—NH—, trans—NH—CO—CH=CH—CO—NH—

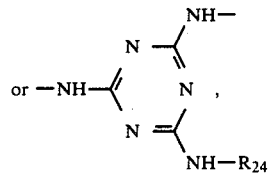

wherein
$R_{24}$ is hydrogen, phenyl or 3-sulfophenyl,
each of
$K_1$ and $K_2$ is independently

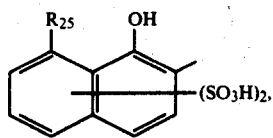

wherein
R$_{25}$ is —NH$_2$ or —OH, and

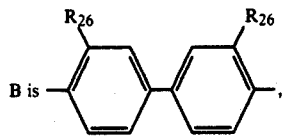

wherein each
R$_{26}$ is hydrogen, methyl or methoxy.

8. A concentrated, liquid dye composition according to claim 7 comprising (i) 1 part by weight of a dye, (ii) 0.5 to 5 parts by weight of urea and (iii) 1 to 8 parts by weight of water,
wherein said dye is a dye of the formula

R$_{11}$—N=N—R$_{13}$—A—R$_{14}$—N=N—R$_{12}$ or

K$_1$—N=N—B—N=N—K$_2$, or a salt thereof,
wherein each of
R$_{11}$ and R$_{12}$ is independently

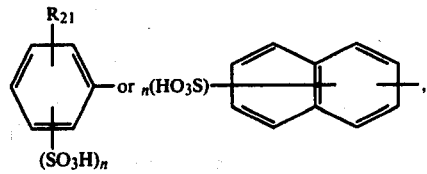

wherein
R$_{21}$ is hydrogen, methyl or methoxy,
and n is 1 or 2,

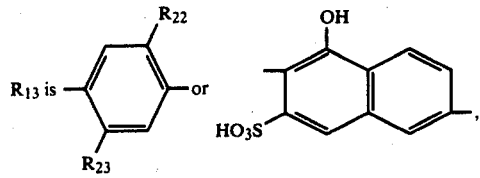

wherein
R$_{22}$ is hydrogen or methoxy,
and

R$_{23}$ is hydrogen or methyl,

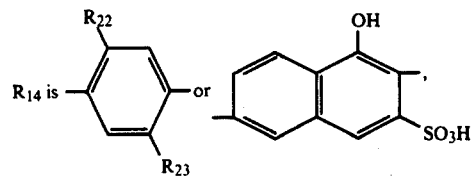

wherein

R$_{22}$ is hydrogen or methoxy,
and

R$_{23}$ is hydrogen or methyl,
A is —NH—, —NH—CO—NH—, trans—N-H—CO—CH=CH—CO—NH—

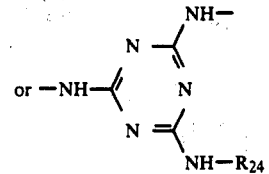

wherein
R$_{24}$ is hydrogen, phenyl or 3-sulfophenyl,
each of
K$_1$ and K$_2$ is independently

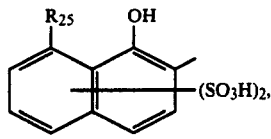

wherein
R$_{25}$ is —NH$_2$ or —OH, and

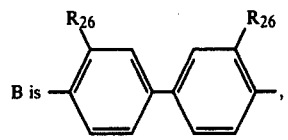

wherein each R$_{26}$ is hydrogen, methyl or methoxy.

9. A concentrated, liquid dye composition according to claim 8 consisting essentially of (i) 1 part by weight of a dye, (ii) 0.5 to 5 parts by weight of urea and (iii) 1 to 8 parts by weight of water.

10. A concentrated, liquid dye composition according to claim 9 consisting essentially of (i) 1 part by weight of a dye, (ii) 0.5 to 2 parts by weight of urea and (iii) 1 to 8 parts by weight of water.

11. A concentrated, liquid dye composition according to claim 8
wherein said dye is a dye of the formula

R$_{11}$—N=N—R$_{13}$—A—R$_{14}$—N=N—R$_{12}$, or a salt thereof,
wherein each of
R$_{11}$ and R$_{12}$ is independently

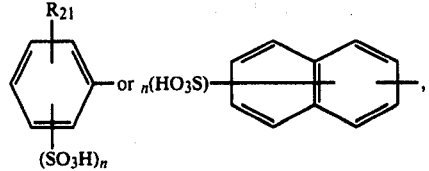

wherein
R$_{21}$ is hydrogen, methyl or methoxy,
and n is 1 or 2, $R_{13}$ is 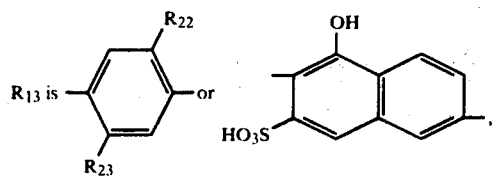

wherein
$R_{22}$ is hydrogen or methoxy, and $R_{23}$ is hydrogen or methyl,

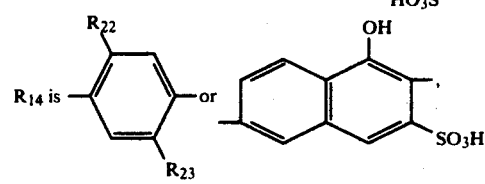

wherein $R_{22}$ is hydrogen or methoxy, and $R_{23}$ is hydrogen or methyl, and A is —NH—, —NH—CO—NH—, trans—NH—CO—CH=CH—CO—NH—

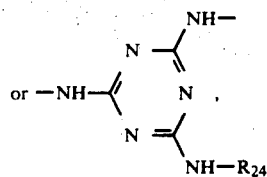

wherein
$R_{24}$ is hydrogen, phenyl or 3-sulfophenyl.

12. A concentrated, liquid dye composition according to claim 11 wherein said dye is the dye of the formula

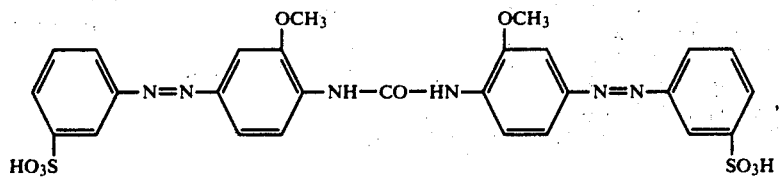

or a salt thereof.

13. A concentrated, liquid dye composition according to claim 12 wherein said dye is the dye of the formula

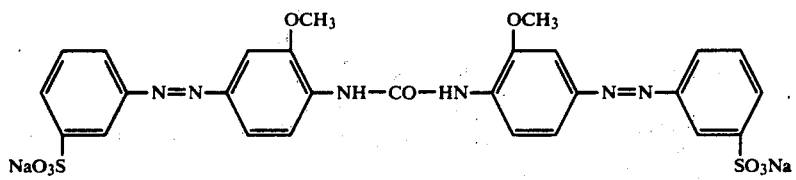

14. A concentrated, liquid dye composition according to claim 11 wherein said dye is the dye of the formula

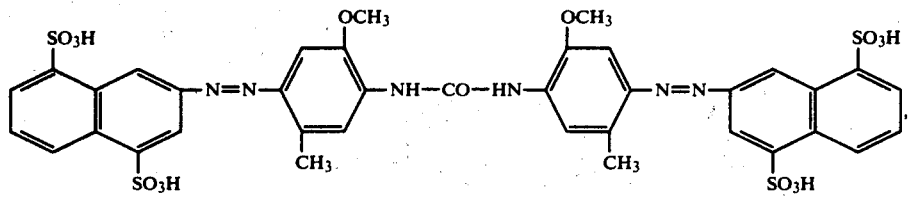

or a salt thereof.

15. A concentrated, liquid dye composition according to claim 14 wherein said dye is the dye of the formula

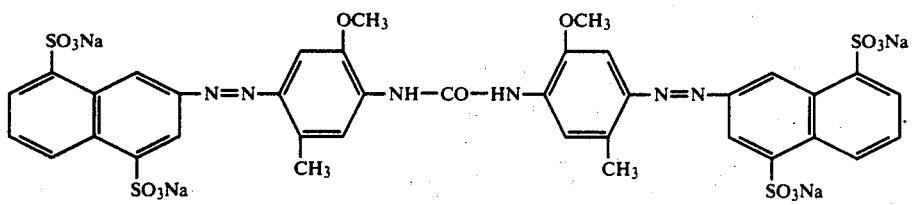

16. A concentrated, liquid dye composition according to claim 11 wherein said dye is the dye of the formula

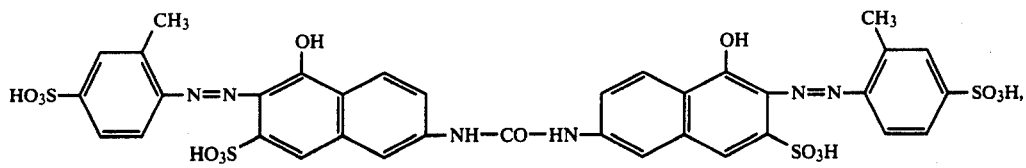

or a salt thereof.

17. A concentrated, liquid dye composition according to claim 11 wherein said dye is the dye of the formula

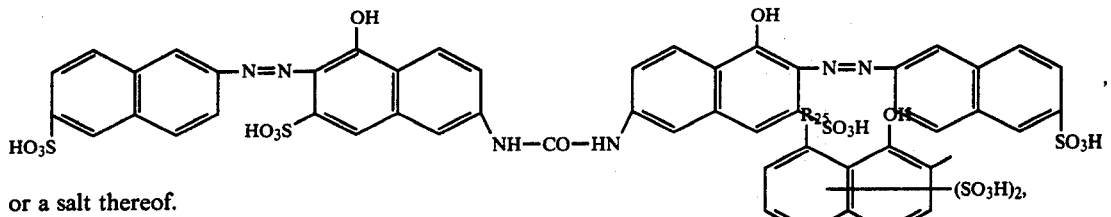

or a salt thereof.

18. A concentrated, liquid dye composition according to claim 8 wherein said dye is a dye of the formula

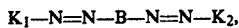

or a salt thereof,
wherein each of $K_1$ and $K_2$ is independently

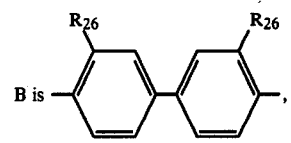

wherein $R_{25}$ is —$NH_2$ or —OH, and

B is wherein each
$R_{26}$ is hydrogen, methyl or methoxy.

19. A concentrated, liquid dye composition according to claim 18 wherein said dye is the dye of the formula

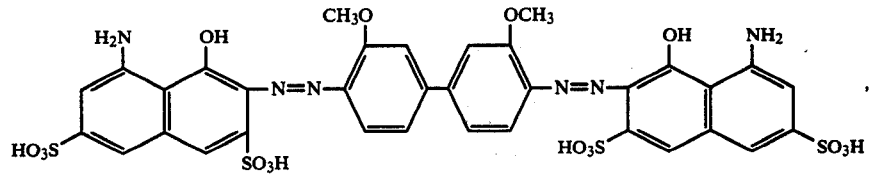

or a salt thereof.

20. A concentrated, liquid dye composition according to claim 19 wherein said dye is the dye of the formula

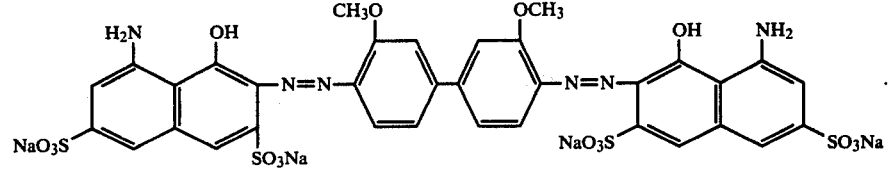

* * * * *

UNITED STATES PATENT AND TRADEMARK OFFICE
CERTIFICATE OF CORRECTION

PATENT NO. : 4,149,851
DATED : April 17, 1979
INVENTOR(S) : Alfred Frei, Georg Schoefberger and August Schweizer It is certified that error appears in the above-identified patent and that said Letters Patent are hereby corrected as shown below:

Column 6, line 5, that portion of the structural formula reading

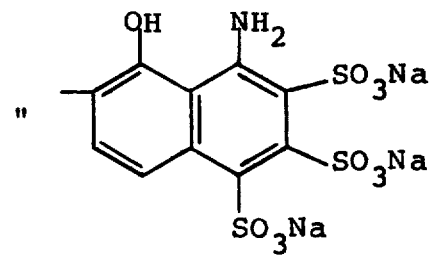 " should read -- 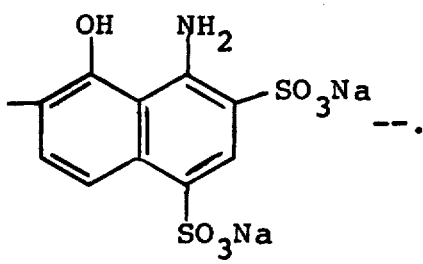 --.

Columns 5-6, Table 1, Example 10, "as D" should read (--"--), "as C" should read -- as D --, " " " in column F should read -- as C -- and insert -- " -- in last column. Column 11, line 65, that portion of the structural formula reading

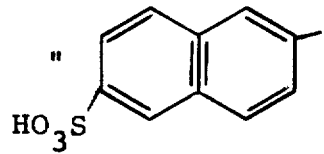 " should read -- 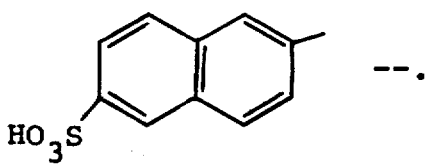 --.

Column 14, line 22, "a diphenylene" should read --diphenylene--.

Signed and Sealed this

Twenty-ninth Day of January 1980

[SEAL]

Attest:

SIDNEY A. DIAMOND

Attesting Officer   Commissioner of Patents and Trademarks